United States Patent Office 3,442,915
Patented May 6, 1969

3,442,915
SYNTHESIS OF 2,6-DIALKYLQUINONES BY ACID DECOMPOSITION OF 2,6-DIALKYL-4-t-ALKYL-4-ALKYLPEROXYCYCLOHEXADIEN-2,5-ONE-1
William H. Starnes, Baytown, Tex., assignor to Esso Research and Engineering Company, a corporation of Delaware
No Drawing. Filed Nov. 24, 1965, Ser. No. 509,634
Int. Cl. C07c 45/00, 49/62
U.S. Cl. 260—396                                     3 Claims

ABSTRACT OF THE DISCLOSURE

A 2,6-dialkyl-4-t-alkyl-4-alkylperoxycyclohexadien-2,5-one-1 is decomposed by using either a Lewis or Bronsted acid to form 2,6-dialkylquinones.

---

The present invention is directed to a novel synthesis of 2,6-dialkylquinones. More specifically, it is directed to the decomposition of 2,6-dialkyl-4-t-alkyl-4-alkylperoxycyclohexadien-2,5-one-1 with an acid.

The present invention may be briefly described as a method for synthesizing 2,6-dialkylquinones starting with a 2,6-dialkyl-4-t-alkylphenol in two steps by converting the tri-substituted phenol to its corresponding 4-alkylperoxydienone which is then decomposed with an acid to the 2,6-dialkylquinone. The preferred starting material is a 2,4,6-tri-t-alkylphenol.

The 2,6-dialkylquinones are known compositions of matter and have known utility. For example, the 2,6-di-t-alkylquinones have pleasant spicy aromas and are useful in the perfume industry. Further, the quinones may be reduced to the hydroquinones which are good antioxidants. Heretofore, attempts to synthesize quinones from alkylphenols have resulted in quite low yields of quinone. An example of the synthesis of a substituted quinone from 2,6-di-t-alkyl-p-cresol is set forth in U.S. Patent No. 2,657,222.

According to the process of the present invention, a 2,6-dialkyl-4-t-alkylphenol is converted to its corresponding 2,6 - dialkyl-4-t-alkyl-4-alkylperoxycyclohexadien-2,5-one-1 by the following reaction:

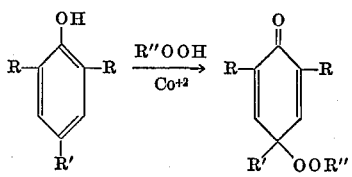

where

R is $C_1$ to $C_{20}$ alkyl or preferably $C_4$ to $C_{20}$ t-alkyl;
R' is $C_4$ to $C_{20}$ t-alkyl; and
R" is a radical associated with a particular hydroperoxide used and which may be $C_1$ to $C_{20}$ alkyl, a cycloalkyl, or an aralkyl.

In the practice of the present invention when the phenol is a 2,4,6-tri-t-alkylphenol there is a substantial increase in the yield of the precursor to the desired quinone. This first reaction step is accomplished by a system which will specifically produce peroxy radicals such as by using a hydroperoxide. Specific systems are an alkyl hydroperoxide such as t-butyl hydroperoxide in the presence of a transition metal catalyst such as cobaltous or manganous naphthenate. Another peroxide initiator system might be cumyl hydroperoxide in the presence of cobaltous or manganous oleate or ferrous naphthenate. Still another hydroperoxide which may be used is 1-methylcyclohexyl hydroperoxide in the presence of a transition metal catalyst.

The conversion of the 2,6-dialkyl-4-t-alkyl-4-alkylperoxycyclohexadien-2,5-one-1 to the 2,6-dialkylquinone is accomplished by decomposition with an acid in high yield, and the desired product is readily recoverable. This reaction may be shown as follows:

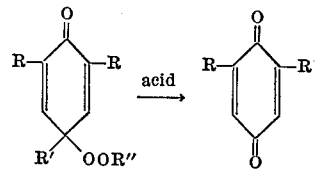

The decomposition may be accomplished by using either a Lewis acid or a Bronsted acid. The decomposition is carried out in a solvent which is inert to the peroxide and also preferably inert to the acid. Thus, the decomposition may be carried out with hydrogen chloride in a benzene solution, with boron trifluoride etherate or ferric chloride in an inert organic solvent, or with sulfuric acid in acetic anhydride or benzene solution. The decomposition is carried out at a temperature below that at which thermal decomposition of the peroxide occurs. The temperature may be within the range of —20° to 110° C.

The present invention will be illustrated by the following specific examples which are considered to be illustrations and not limitations on the invention.

EXAMPLE 1

A solution of 2,4,6-tri-t-butylphenol (26.24 g., 0.100 mole) and t-butyl hydroperoxide (95% pure, 18.95 g.,) 0.200 mole) in 100 ml. of anhydrous benzene was stirred at room temperature and treated with a total of 2.63 g. of cobaltous naphthenate (6% cobalt). The naphthenate was added in portions of 6 to 10 drops, and the maximum temperature rise was to 31.5° C. After filtering the mixture to remove insoluble cobalt residues, solvent was removed in vacuo on a rotary evaporator; and the residual oil was subjected to chromatography on 500 g. of alumina (reagent grade) using petroleum ether (B.P. 30–60°) as the eluent. In this way there was obtained 21.71 g. (62%) of pure 2,4,6-tri-t-butyl-4-t-butylperoxycyclohexadien-2,5-one-1 (a pale yellow oil) and 7.50 g. (21% of the same product which contained only traces of impurities and was sufficiently pure for use in the next step of the synthesis.

EXAMPLE 2

The dienone (3.51 g., 0.010 mole) was dissolved in 130 ml. of acetic anhydride, and the solution was stirred while 1.0 g. (0.54 ml.) of concentrated sulfuric acid was added. The resulting solution was allowed to stand in a stoppered flask in the dark for 25.5 hours at room temperature. Ice water (400 ml.) was then added slowly with shaking, and the mixture was refrigerated for about two days. It was then extracted with three 150 ml. portions of ether. The combined extracts were washed with four 100 ml. portions of 3 N aqueous sodium carbonate and 100 ml. of saturated aqueous sodium chloride solution, then dried over Drierite and evaporated under vacuum at room temperature. The residual orange solid weighed 2.95 g. and was shown by gas chromatography to contain at least 60% of 2,6-di-t-butylquinone (1.77 g., 80% yield). Recrystallization from methanol gave the pure product, M.P. 68–69.5°.

EXAMPLE 3

The same dienone as was used for the preceding example (1.75 g., 0.005 mole) was dissolved in 55 ml. of anhydrous benzene, and the solution was stirred while 0.85 g. of boron trifluoride etherate was added. The mixture was stoppered tightly under nitrogen and allowed to stand in the dark for 18.5 hours. It was then washed with 30 ml. of water and two 30 ml. portions of 1 N aqueous sodium carbonate, dried with Drierite, and evaporated at 25° under 5 to 10 mm. pressure. The residue was shown by NMR analysis to be essentially pure 2,6-di-t-butylquinone. The yeld was 1.03 g., or 94%.

EXAMPLE 4

The peroxydienone of the preceding examples (1.75 g., 0.005 mole) was dissolved in 65 ml. of anhydrous benzene, and the solution was bubbled with gaseous hydrogen chloride for five minutes, stoppered tightly under nitrogen, and allowed to stand in the dark for 94.5 hours. The reaction mixture was processed as described in the preceding example to give an essentially quantitative yield of 2,6-di-t-butylquinone.

EXAMPLE 5

The peroxydienone of the preceding examples (0.875 g., 0.0025 mole) was dissolved in 32.5 ml. of anhydrous benzene, and the solution was treated with 0.05 g. of concentrated sulfuric acid. The mixture was sealed tightly under nitrogen and allowed to stand in the dark for 240 hours. It was then worked up by the procedure used for Example 3 to give 0.79 g. of product. Analysis of this material by NMR showed that it contained 2,6-di-t-butylquinone (41% yield) together with 59% of unreacted peroxydienone.

EXAMPLE 6

The peroxydienone of the preceding examples (1.75 g., .005 mole) was dissolved in 65 ml. of anhydrous benzene, and anhydrous ferric chloride (0.20 g., 0.0012 mole) was added. The mixture was stoppered tightly under nitrogen and allowed to stand in the dark for 24 hours. It was then worked up in a manner similar to that described in Example 3. Analysis of the product showed that it consisted of 2,6-di-t-butylquinone (about 50% yield) and the starting peroxydienone (approximately 50% recovery).

The foregoing examples illustrate that the decomposition of the 4-t-alkyl-4-alkylperoxydienone with an acid yields the quinone. The present invention will be further illustrated to point out the necessity of the *tertiary* alkyl in the 4 position. The presence of a *primary* alkyl in the 4 position yields an entirely different product.

EXAMPLE 7

A solution of 2,6-di-t-butyl-4-methyl-4-t-butylperoxycyclohexa-2,5-dien-1-one in an amount of 1.54 parts in anhydrous benzene of 65 volumes was saturated with gaseous hydrogen chloride and the solution was held under nitrogen and allowed to stand in the dark for two days. The resulting mixture containing the reaction product was then washed in succession with 30 volumes of water, two 20-volume portions of 1 N sodium carbonate solution and 25 volumes of saturated aqueous sodium chloride. After separation from the several treating reagents, the solution was contacted with an adsorbent, such as Drierite, to remove water and the solvent was evaporated from the reaction product under reduced pressure of 5–10 mm. to obtain one part of an oily phase which was then submitted for analysis and found to contain over 90% of 2-chloro-6-t-butyl-p-cresol.

The nature and object of the present invention having been completely described and illustrated and the best mode thereof contemplated set forth, what I wish to claim as new and useful and secure by Letters Patent is:

1. The synthesis of 2,6-dialkylquinones which comprises the decomposition of a 2,6-dialkyl-4-t-alkyl-4-alkylperoxycyclohexadien-2,5-one-1 with a Lewis or Bronsted acid in an inert solvent.

2. The synthesis according to claim 1 wherein said 2,6 - dialkyl - 4 - t - alkyl-4-alkylperoxycyclohexadien-2,5-one-1 is 2,4,6 - tri - t-butyl-4-t-butylperoxycyclohexadien-2,5-one-1.

3. The synthesis according to claim 1 wherein said acid is selected from the group consisting of hydrogen chloride, boron trifluoride etherate, ferric chloride, and sulfuric acid.

References Cited

UNITED STATES PATENTS

| 2,657,222 | 10/1953 | Allen et al. | 260—396 |
| 3,213,114 | 10/1965 | Braxton et al. | 260—396 |

OTHER REFERENCES

Chemical Abstracts, vol. 53 (1959), by Müller et al., pages 2142d to 2143d relied on.

LORRAINE A. WEINBERGER, *Primary Examiner.*

L. A. THAXTON, *Assistant Examiner.*